United States Patent

Wolff

Patent Number: 5,987,625
Date of Patent: Nov. 16, 1999

[54] METHOD AND APPARATUS FOR TESTING NETWORK BOOTABLE DEVICES

[75] Inventor: Robert M. Wolff, Fremont, Calif.

[73] Assignee: Samsung Electronics Co., Ltd., Suwon, Rep. of Korea

[21] Appl. No.: 08/726,118

[22] Filed: Oct. 4, 1996

[51] Int. Cl.$^6$ .................................................. G06F 11/22
[52] U.S. Cl. .................................................. 714/36; 713/2
[58] Field of Search .................. 395/183.19, 183.12, 395/651, 652, 183.16, 183.17, 183.18, 183.2, 183.08, 200.51, 200.52

[56] References Cited

U.S. PATENT DOCUMENTS

| | | | |
|---|---|---|---|
| 5,193,174 | 3/1993 | Bealkowski et al. | 395/500 |
| 5,463,766 | 10/1995 | Schieve et al. | 395/183.12 |
| 5,465,357 | 11/1995 | Bealkowski et al. | 395/700 |
| 5,535,330 | 7/1996 | Bell | 395/183.12 |
| 5,673,385 | 9/1997 | Mack et al. | 395/183.12 |
| 5,732,268 | 3/1998 | Bizzarri | 395/652 |
| 5,805,882 | 9/1998 | Cooper et al. | 395/652 |
| 5,875,293 | 2/1999 | Bell et al. | 395/183.03 |

*Primary Examiner*—Robert W. Beausoliel, Jr.
*Assistant Examiner*—Scott T. Baderman
*Attorney, Agent, or Firm*—Kenneth L. Sherman, Esq.; Sherman & Sherman

[57] ABSTRACT

A method and apparatus for testing a network bootable device provides a bootmode signature on the device to indicate whether a production test is to be performed. If a production test is to be performed, then test software is downloaded over a network from a server to device memory and then executed. If the test is successful, the bootmode signature is updated so that subsequent production tests are not performed. If the production test is not to be performed, then end user software is downloaded from the server to the device and executed.

29 Claims, 3 Drawing Sheets

METHOD AND APPARATUS FOR TESTING NETWORK BOOTABLE DEVICES

FIELD OF THE INVENTION

The present invention relates to network bootable devices, and more specifically, to a method and apparatus for testing network bootable devices.

BACKGROUND OF THE INVENTION

Due to the proliferation of computer software and services, an increasing trend in the computer industry has been to store software on a network and reduce the amount of software and data stored locally on a computer. This approach provides a consumer with access to a wide variety of software and also to the most recent versions of software without having to load the software from disks to each computer whenever an upgrade becomes available.

Some computers systems maintain only a minimum software configuration locally and download their remaining software from a server, including the end user operating system (OS) from a network. Otherwise known as a "network bootable device", such a system may be either a stand alone device, such as a computer terminal, or may be part of a larger device or system. Regardless of their specific implementation, network bootable devices generally share the common characteristic of a minimal software startup configuration which is supplemented by additional software provided by a server over a network or other communications link.

On-site post-production testing of network bootable devices has achieved great importance in the ensurance of product quality and reliability. Manufacturers expend a great amount of effort and expense on post-production testing prior to shipping to ensure that their products perform all of their intended functions without errors. The most robust post-production tests are "full production tests" which perform exhaustive checks of all product features. Some full production tests are performed by test application software downloaded to the device after the OS has been downloaded and is running. However, some device errors and failures can prevent the OS itself from running which precludes the use of test application software. Therefore, low level test software, in the form of a test OS, is often used. Several different approaches to low level post-production testing of network bootable devices at the manufacturing facility have been used in the past.

One approach for implementing low level production tests for network bootable devices involves temporarily installing a test ROM in the device, the test ROM already containing the code for a full production test. After startup, the full production test code provides a full production test on the device to be performed. After successful completion of the full production test, the temporary test ROM is replaced by the manufacturer with the end user ROM containing the standard startup code. This approach provides the benefit of a full production test while not occupying any space in the end user ROM. However, it is not without its disadvantages. First, the installation and removal of a test ROM increases production test costs over simply testing the end user configuration. Also, the use of a test ROM necessarily means that the tested configuration is different than the actual end user configuration. Whenever the test configuration differs from the actual end user configuration, the validity of the test is suspect. The most reliable type of production testing will test the device in its actual end user configuration. In addition, the prior approach does not allow field testing of the device, without first removing the end user ROM and temporarily installing a test ROM, which cannot be done by an end user.

As an alternative to actually installing a test ROM in the product, a "ROMulator" or ROM test jig may be used to "inject" production test code into the memory of the device so that a full production test may be performed. This approach eliminates the need to install a test ROM and therefore minimizes the likelihood that the device will be damaged or altered. However, a ROMulator or ROM test jig is usually very expensive and only allows the testing of one device per test jig. Moreover, the use of a ROMulator or ROM test jig has nearly the same testing uncertainty as a test ROM and still does not allow for field testing of the device.

Another approach for implementing low level production tests for network bootable devices involves embedding the production test code in non-volatile memory, typically in the "OS ROMs". The test code resides concurrently with the OS and may be executed when necessary. This approach provides a full production test of the end user device configuration without the added costs associated with using a test ROM or ROMulator. Moreover, this approach allows the device to be field tested without changing the hardware configuration. However, this approach has several disadvantages. First, a full production test occupies valuable ROM space which instead could be used for the OS. Since the full production test code is not part of the operational software, and in most cases is only used once, the test code becomes "dead code" and the space occupied by the dead code in ROM becomes wasted space. In addition, once programmed into the device's ROM, the test code cannot be easily updated. Although flash ROMs may provide the capability to update the embedded test code, such an update is not easily performed in all cases.

As a compromise to a full production test, many network bootable devices include only a minimal production test embedded in the OS ROM. Although the OS ROM can be difficult to change, this approach provides a reasonably good test without using large amounts of ROM space, but still fails to provide a full production test.

SUMMARY OF THE INVENTION

In view of the difficulties and limitations associated with prior approaches for low level testing network bootable devices, there is a need for a method and apparatus providing for full, low level production testing of network bootable devices, either at post production or in the field, which does not occupy valuable non-volatile memory space in the device while providing for updates to the production test.

This and other needs are met by embodiments of the present invention, which provide a method for testing a device that includes examining a test indicator to determine whether a test is to be performed. If the test is to be performed, test software is downloaded from a network to the device and then executed. If the test is not to be performed, then end user software is downloaded from the network to the device and then executed.

According to another aspect of the present invention, a method for production testing a device includes establishing a communications link between the device and a server and then reading a test indicator stored on the device to determine whether a production test is to be performed. If a production test is to be performed, the device requests test software from the server which is downloaded to a first memory in the device and then executed. If the production test is successful, the test indicator is updated so that subsequent production tests will not be performed.

According to yet another aspect of the present invention, an apparatus is provided for testing a device and includes a means for determining whether a test is to be performed, a means for downloading test software to the device from an external software source and a means for executing the test software to the test device.

According to another aspect of the present invention, a system is provided for production testing a device. The system includes a server which is communicatively coupled to the device and also contains both test software and end user software. The system also includes a processor for controlling the downloading of the test software and the end user software from the server to the device and a first memory for storing the test software and the end user software. In addition, the system includes a second memory in the device for storing a bootmode signature which indicates whether a production test is to be performed on the device. Finally, the system includes a means for performing the testing of the device in accordance with the test software.

According to another aspect of the present invention, a network bootable device is provided which includes a first non-volatile memory, a communications interface and a signal processor. The first non-volatile memory is devoid of production test software and is used for storing a test indicator. The communications interface is used for receiving production test software from a source external to the network bootable device. Finally, the signal processor is used for examining the test indicator and for controlling the downloading to the device of the production test software as a function of the test indicator. The signal processor is also used for performing the production testing of the network bootable device in accordance with the production test software.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF AN ILLUSTRATIVE EMBODIMENT

A method and apparatus for providing full, low level production testing of a network bootable device is described. In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are illustrated in block diagram form in order to avoid unnecessarily obscuring the present invention.

Figure 1:
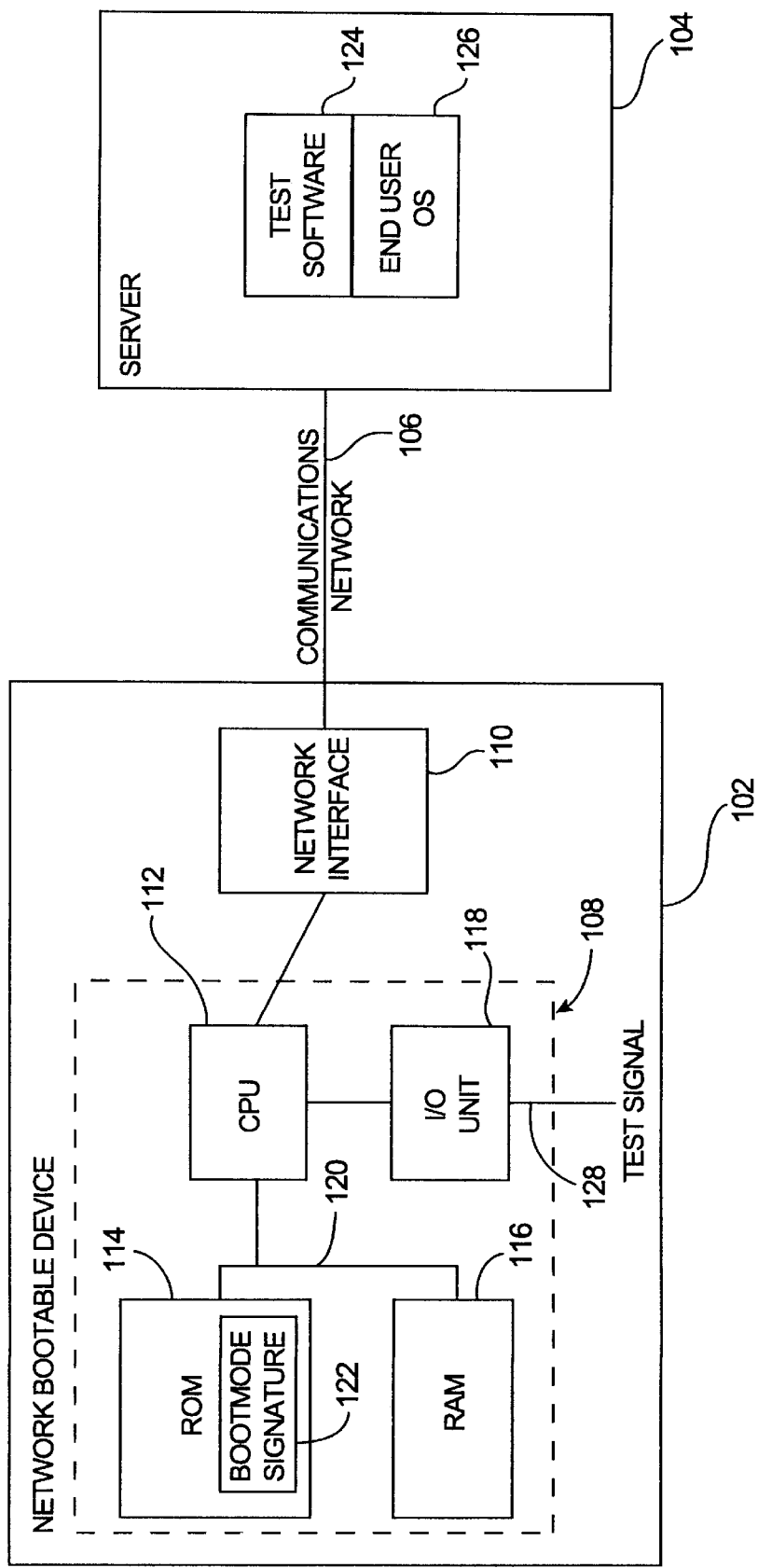
FIG. 1 is a block diagram of an apparatus for providing full, low level production testing of a network bootable device according to an embodiment of the present invention.

An apparatus 100 is illustrated in FIG. 1 for providing full, low level production testing of a network bootable device 102 that is communicatively coupled to a server 104 by a communications network 106. In the exemplary embodiment, the network bootable device 102 is any signal processing based device, usually with minimal non-volatile storage capability, which downloads an operating system (OS) and any application software from the server 104 upon startup. The device 102 includes, among other components, a signal processor 108 and a network interface 110. The signal processor 108 includes a central processing unit (CPU) 112, a non-volatile memory in the form of a read-only memory (ROM) 114, a random access memory (RAM) 116 and an input/output (I/O) unit 118, all interconnected by a communications bus 120.

The CPU 112 executes instructions contained in both the ROM 114 and the RAM 116 to perform its intended functions and communicates with other elements (not shown) contained in the device 102 via the I/O unit 118. The ROM 114 contains instructions for bootstrapping the signal processor 108. In embodiments of the present invention, bootstrapping includes performing a power-on-self-test (POST), establishing a network connection to the server 104 via communications network 106 and downloading software from the server 104 to RAM 116. The POST primarily tests the basic integrity of the signal processor 108 and the communications link to the server 104. Specifically, this includes a test of the communications bus 120, a memory test of ROM 114 and RAM 116 as well as an interface test of both the I/O unit 118 and the network interface 1 10.

According to one embodiment of the present invention, ROM 114 includes a "bootmode signature" 122 for providing full, low level production testing of the device 102. The bootmode signature 122 is a test indicator stored in a particular location in the ROM 114 which, when read by the signal processor 108 after the POST, indicates whether the device 102 is to be started in a test mode or an end user mode. When the device 102 is started in the test mode, as indicated by the bootmode signature 122, test software 124 is downloaded from server 104 into RAM 116 over the communications network 106. The test software 124 contains instructions which, when executed by signal processor 108, perform a full, low level production test of the device 102. Although the test software 124 may perform all of the test functions which would be performed by an application program executing on a full OS, the test software 124 contains sufficient low level code to safely detect and identify errors and faults which, under some circumstances, would cause the termination of a full OS.

If the full production test is successful, the test software 124 updates the bootmode signature 122 so that anytime the device 102 is restarted, the signal process 108 will start the device 102 in end user mode. To facilitate updating of the bootmode signature 122, the ROM 114 is a flash ROM, $E^2$ ROM, or any other type of non-volatile memory which may be updated. The test software 124 then causes the restarting of the device 102, which now restarts in the end user mode.

In contrast to the test mode, when started in the end user mode, the device 102 causes an end user OS 126 to be downloaded from server 104 over the communications network 106 into RAM 116. The end user OS 126 contains instructions which, when executed by signal processor 108, provides a software layer to support application software required by the device 102. Alternatively, the end user OS 126 may itself provide the functionality required by the device 102.

There may be times when it is desirable to restart the device 102 in the test mode, even though the bootmode signature 122 indicates that the device 102 is to be started in the end user mode. This situation typically occurs when a problem is identified after the device 102 is sold and installed and a field test would be helpful to evaluate the device 102. Therefore, according to another aspect of the present invention, a test signal may be provided on line 128 to I/O unit 118 to cause CPU 112 to rewrite the bootmode signature 122 to indicate test mode and then restart the device 102. The test signal may be generated internally on the device 102 itself or may be provided to the device 102 from an external source. For example, the test signal may be generated by a sequence of keystrokes or user actions on device 102 or may simply consist of an external switch. This allows the device 102 to be tested in the field by an end user who is informed on how to generate the test signal.

Figure 2A:
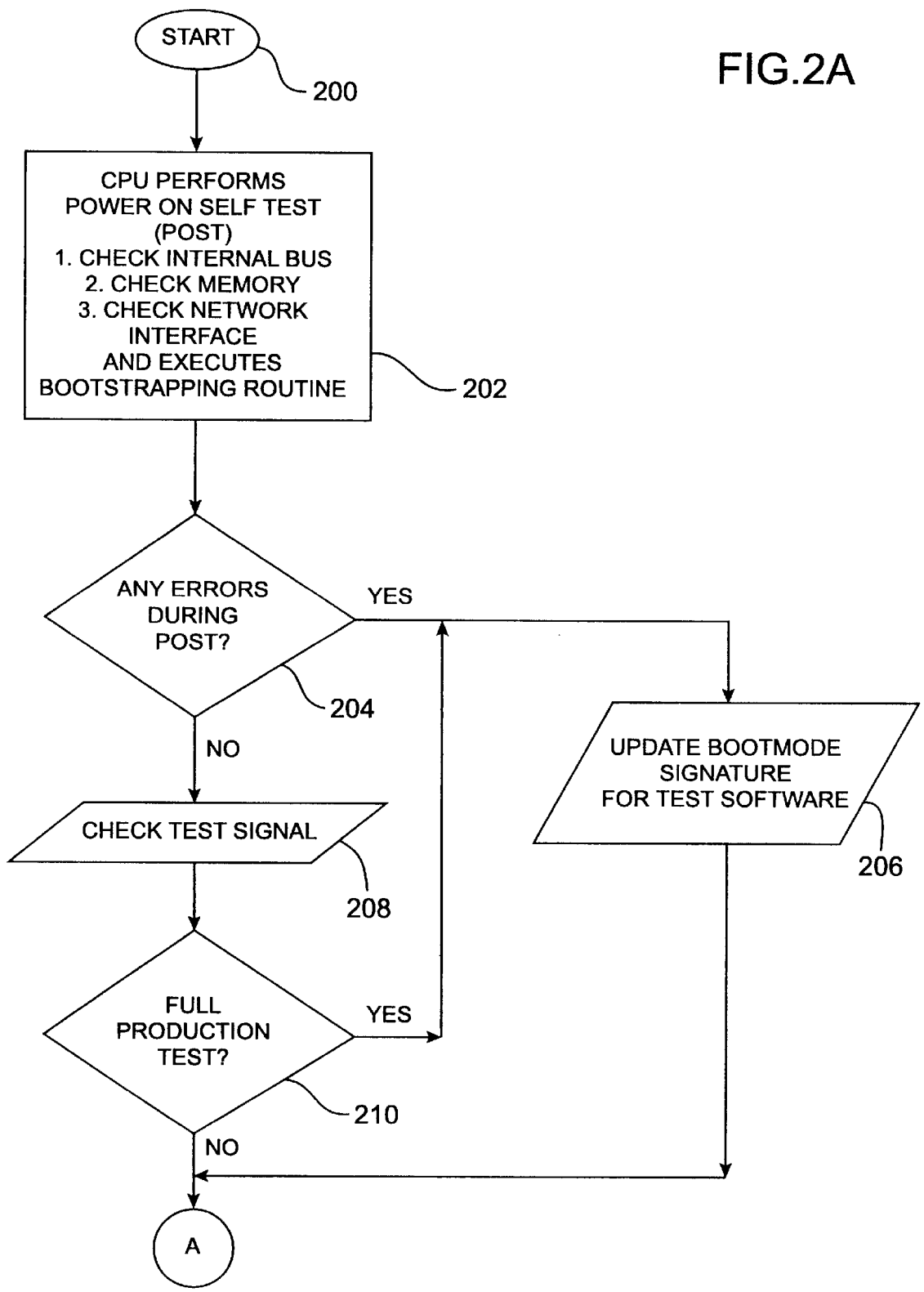
FIGS. 2A and 2B comprise a flow chart of a method for providing full, low level production testing of a network bootable device according to an embodiment of the present invention.
Figure 2B:
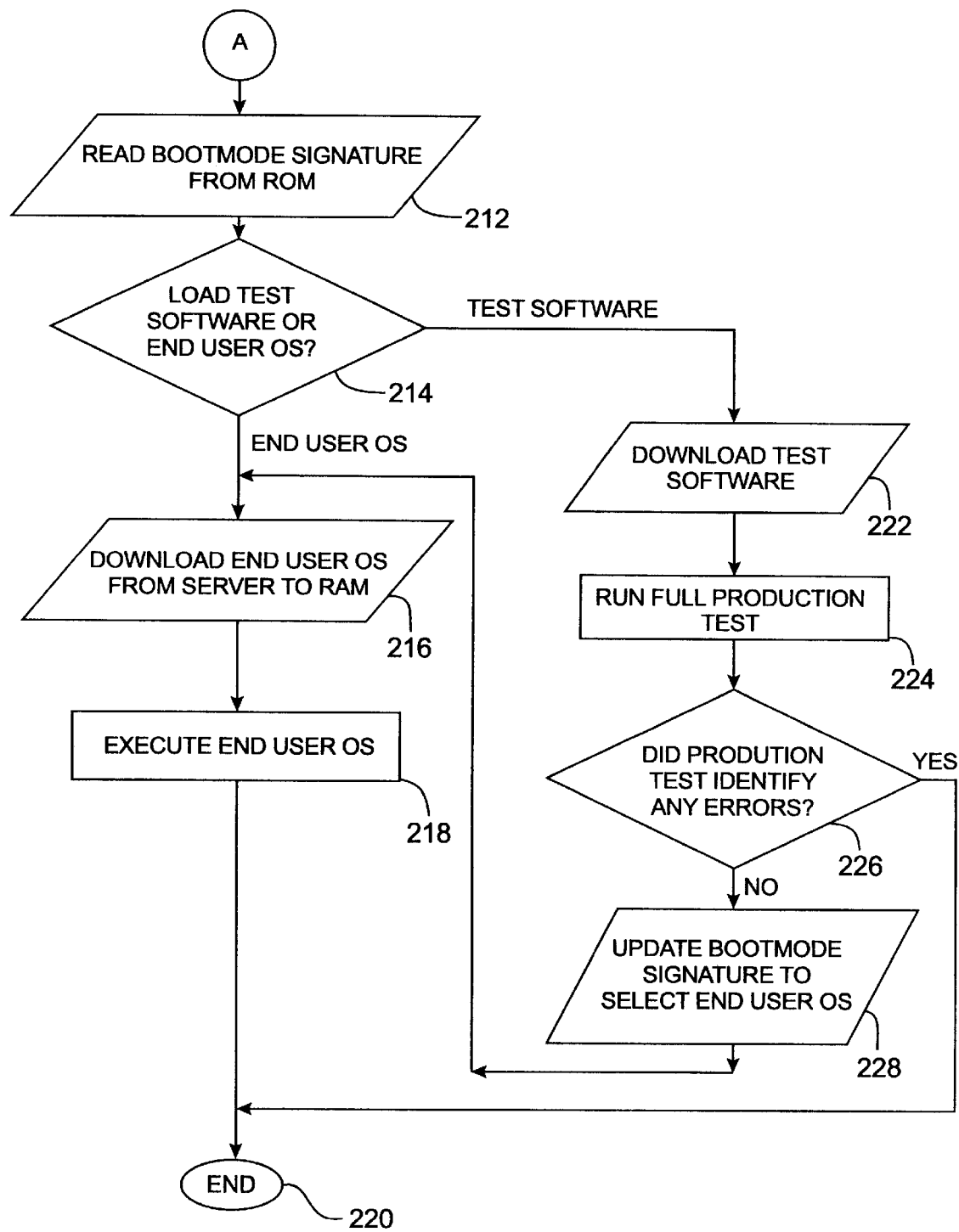

According to another embodiment of the present invention, a method provides for the full, low level production testing of a network bootable device 102. The method is described with reference to FIGS. 1, 2A and 2B. FIGS. 2A and 2B illustrate the specific steps for providing low level, full production testing of a network bootable device according to an embodiment of the present invention.

After the signal processor 108 is started in step 200, the CPU performs a power on self test (POST) and then executes a bootstrapping routine in step 202. The POST includes a simple check of the communications bus 120, a memory test of ROM 114 and the RAM 116 as well as a test of both the network interface 110 and the communications network 106. In step 204, a determination is made as to whether any errors occurred during the POST. If errors occurred during the POST, then in step 206 the bootmode signature is updated to require the execution of a full production test. If, on the other hand, in step 204 a determination is made that no errors occurred during the POST, then in step 208, the test signal is read. In step 210 a determination is made based upon the test signal as to whether a full production test should be performed. If in step 210 it is determined that a full production test should be performed, then in step 206 the bootmode signature 122 is updated to indicate that a full production test should be run.

If after the update of the bootmode signature 122 in step 206 or, if in step 210 a determination is made that based upon the test signal a full production test is not required, then in step 212 the bootmode signature 122 is read from the ROM 114.

In step 214, a determination is made based upon the bootmode signature 122 as to whether the test software 124 or the end user OS 126 should be loaded into RAM 116. If it is determined that the end user OS 126 should be loaded, then in step 216 the end user OS 126 is downloaded from the server 104 to RAM 116. Then, in step 218, the end user OS is executed and the process completed in step 220.

If, on the other hand, in step 214, it is determined that the test software 124 is to be loaded, then in step 222, the test software 124 is downloaded from the server 104 to RAM 116. Then, in step 224, the full production test is run. Following the full production test, a determination is made in step 226 as to whether any errors occurred in the execution of the production test. If no errors occurred during the production test, then, in step 228 the bootmode signature 122 is updated to indicate that the end user OS 126 should be loaded into RAM 116. Then, the end user OS 126 is downloaded into the RAM 116 of the signal processor 108 in step 216 and the end user OS 126 executed in step 218 and the process completed in step 220. If, on the other hand, in step 226, errors occurred during the production test then, the bootmode signature 122 is left alone and the test software 124 remains in the RAM 116 and the process is completed in step 220.

The method described above according to an embodiment of the present invention provides for the full, low level production testing of a network bootable device by downloading test software from a server into device 102 RAM 116 based on the value of a bootmode signature 122 stored in the device 102 ROM 114.

As would be appreciated by a person having ordinary skill in the art, this method provides several advantages over prior approaches. First, the use of test ROMs and ROMulators is avoided. Also, the test software is not stored in the device 102 ROM 114, leaving substantially the entire ROM 114 space for the OS. Since the test software is maintained on the server 104 and downloaded into RAM 116, it may be a full production test and be periodically updated. In addition, the test software 124 may be downloaded immediately after production or later during a field test through the use of the test signal.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for testing a network bootable device, the method comprising the steps of:

a) examining a test indicator such as a bootmode signature within the device to determine whether a test is to be performed on the network bootable device;

b) if the test is to be performed, downloading test software from a network to the network bootable device and executing the test software; and c) if the test is not to be performed, downloading end user software from the network to the network bootable device and executing the end user software.

2. The method of claim 1, further comprising the step of, upon successful performance of the test, changing the testing indicator so that subsequent tests will not be performed.

3. The method of claim 1, wherein the steps of downloading include the step of establishing a communications link to a server connected to the network.

4. The method of claim 3, wherein the step of examining the test indicator further comprises the step of reading the bootmode signature from a first memory contained in the device, and wherein the step of downloading the test software from the network to the device and executing the test software further comprises the step of downloading the test software from the server connected to the network to a second memory contained in the device, and wherein the step of downloading end user software from the network to the device and executing the end user software further comprises the step of downloading the end user software from the server connected to the network and storing the end user software in the second memory.

5. The method of claim 4, further comprising the steps of, requesting the test software from the server by the device, and requesting the end user software from the server by the device.

6. The method of claim 1, further comprising the step of performing a power-on-self-test (POST) on the device to determine whether a test is to be performed.

7. The method of claim 1, further comprising the steps of, a) sending a test signal to the device, and b) setting the test indicator to indicate that a test is to be performed on the device.

8. A method for production testing a network bootable device, the method comprising the steps of:
   a) establishing a communications link between the network bootable device and a server;
   b) reading a test indicator such as a bootmode signature on the network bootable device regardless of the boot status of the device to determine whether a production test is to be performed;
   c) if a production test is to be performed, the network bootable device requesting test software from the server;
   d) in response to the request for the test software, the server downloading the test software to a first memory contained in the network bootable device and the network bootable device executing the test software;
   e) if the production test is successful, updating the test indicator so that subsequent production test will not be performed.

9. The method of claim 8, further comprising the steps of,
   a) if a production test is not to be performed, the device requesting end user software from the server,
   b) in response to the request for the end user software, the server downloading the end user software to a second memory contained in the device and the device executing the end user software.

10. The method of claim 8, wherein the method further comprises the step of the device performing a power on self test (POST) and if the POST is unsuccessful, the device updating the test indicator to indicate that the production test is to be performed.

11. The method of claim 10, wherein the step of performing the POST further comprises the steps of,
   a) testing an internal bus of the device,
   b) testing the first memory contained in the device, and
   c) testing a network interface contained in the device.

12. The method of claim 8, further comprising the step of setting the test indicator in response to application of an externally applied test signal.

13. An apparatus for testing a network bootable device, the apparatus comprising:
   a) means for determining whether a test is to be performed regardless of the boot status of the device, wherein the determining means examines a bootmode signature;
   b) means for downloading test software to the network bootable device from an external software source; and
   c) means for executing the test software to test the network bootable device.

14. The apparatus of claim 13, further comprising means for updating the bootmode signature.

15. The apparatus of claim 14, further comprising means for receiving a test signal, the update means setting the bootmode signature in response to receipt of the test signal by the means for receiving.

16. The apparatus of claim 13, further comprising power on self test (POST) means for providing a POST.

17. A system for production testing a network bootable device, the system comprising:
   a) a server communicatively coupled to the network bootable device, the server containing test software and end user software;
   b) a processor for controlling the downloading of the test software and the end user software from the server to the network bootable device;
   c) a first memory in the network bootable device for receiving and storing the test software and the end user software;
   d) a second memory in the network bootable device for storing a bootmode signature, the bootmode signature being indicative of whether a production test is to be performed on the network bootable device; and
   e) means for performing the testing of the network bootable device in accordance with the test software.

18. The system of claim 17, further comprising test means for performing a power on self test (POST).

19. The system of claim 17, further comprising means for sensing an externally applied test signal and setting the bootmode signature in response to the test signal.

20. A network bootable device comprising:
   a) a first non-volatile memory devoid of production test software for storing a test indicator such as a bootmode signal within the device;
   b) a communications interface for receiving production test software from a source external to the network bootable device; and
   c) a signal processor for examining the test indicator regardless of the boot status of the device and for controlling the downloading to the network bootable device of the production test software as a function of the test indicator, the signal processor also performing the production testing of the network bootable device in accordance with the production test software.

21. The network bootable device of claim 20, further comprising a second memory for storing the production test software.

22. The network bootable device of claim 21, further comprising means for controlling the downloading to the device of end user software and the execution of the end user software as a function of the test indicator.

23. A method for testing a network bootable device, the method comprising the steps of:
   a) examining a test to determine whether a test is to be performed on the network bootable device by reading a bootmode signature from a first memory contained in the device;
   b) if the test is to be performed, downloading test software from a network to the network bootable device by establishing a communications link to a server connected to the network and executing the test software;
   c) if the test is not to be performed, downloading end user software from the network to the network bootable device and executing the end user software; and
   d) wherein the step of downloading the test software from the network to the device and executing the test software further comprises the steps of downloading the test software from the server connected to the network to a second memory contained in the device, and wherein the step of downloading end user software from the network to the device and executing the end user software further comprises the step of downloading the end user software from the server connected to the network and storing the end user software in the second memory.

24. The method of claim 23, further comprising the steps of:
   requesting the test software from the server by the device, and requesting the end user software from the server by the device.

25. A method for production testing a network bootable device, the method comprising the steps of:

a) establishing a communications link between the network bootable device and a server;

b) reading a test indicator on the network bootable to determine whether a production test is to be performed; the step of reading a test indicator further comprising the step of reading a bootmode signature and wherein the method further comprises the step of the device performing a power on self test (POST) and if the POST is unsuccessful, the device updating the test indicator to indicate that the production test is to be performed;

c) if a production test is to be performed, the network bootable device requesting test software from the server;

d) in response to the request for the test software, the server downloading the test software to a first memory contained in the network bootable device and the network bootable device executing the test software;

e) if the production test is successful, updating the test indicator so that subsequent production test will not be performed.

26. The method of claim 25, wherein the step of performing the POST further comprises the steps of:

a) testing an internal bus of the device, b) testing the first memory contained in the device, and c) testing a network interface contained in the device.

27. An apparatus for testing a network bootable device, the apparatus comprising:

a) a bootmode signature indicative of whether a test is to be performed;

b) means for downloading test software to the network bootable device from an external software source; and c) means for executing the test software to test the network bootable device.

28. The apparatus of claim 27, further comprising means for updating the bootmode signature.

29. The apparatus of claim 28, further comprising means for receiving a test signal, the update means setting the bootmode signature in response to receipt of the test signal by the means for receiving.

* * * * *